US012240691B1

(12) United States Patent
Gwon

(10) Patent No.: US 12,240,691 B1
(45) Date of Patent: Mar. 4, 2025

(54) WASTE COLLECTION VEHICLE FOR UNMANNED SELF COLLECTION OF DUMPSTER AND METHOD FOR AUTOMATICALLY ALIGNING WASTE COLLECTION VEHICLE

(71) Applicant: ECUBE LABS CO., LTD., Seoul (KR)

(72) Inventor: Sun Beom Gwon, Seoul (KR)

(73) Assignee: ECUBE LABS CO., LTD., Seoul (KR)

( * ) Notice: Subject to any disclaimer, the term of this patent is extended or adjusted under 35 U.S.C. 154(b) by 0 days.

(21) Appl. No.: 18/899,290

(22) Filed: Sep. 27, 2024

(51) Int. Cl.
*B65F 3/02* (2006.01)
*B65F 3/14* (2006.01)

(52) U.S. Cl.
CPC .................. *B65F 3/02* (2013.01); *B65F 3/14* (2013.01); *B65F 2003/025* (2013.01)

(58) Field of Classification Search
CPC ......... B65F 3/02; B65F 3/14; B65F 2003/025
USPC ........................................................... 701/36
See application file for complete search history.

(56) References Cited

U.S. PATENT DOCUMENTS 11,319,147 B2 * 5/2022 Maroney ................... B65F 3/02
11,603,265 B2 * 3/2023 Williams ................ B65F 3/043
2017/0341860 A1 * 11/2017 Dodds ....................... B60P 1/50
2020/0247609 A1 * 8/2020 Maroney ................... B65F 3/04
2020/0339347 A1 * 10/2020 Williams ................ B65F 3/043
2021/0292086 A1 9/2021 Mahan et al.

FOREIGN PATENT DOCUMENTS

KR 10-2137096 B1 7/2020
KR 10-2422251 B1 7/2022
KR 10-2424162 B1 7/2022
KR 10-2572548 B1 8/2023

* cited by examiner

*Primary Examiner* — Krishnan Ramesh

(74) *Attorney, Agent, or Firm* — The PL Law Group, PLLC

(57) ABSTRACT

A waste collection vehicle for unmanned self-collection of a dumpster includes a recognition unit configured to recognize the dumpster and a plurality of dumpster holes provided on both sides of the dumpster within a set distance from the dumpster, a steering unit configured to identify outlines of the dumpster and then control a traveling direction of the waste collection vehicle based on the identified outlines until the waste collection vehicle is positioned in front of the dumpster, and a docking unit configured to docks an end of the front loader provided on the waste collection vehicle to the dumpster hole when it is determined that the waste collection vehicle is positioned in front of the dumpster.

8 Claims, 11 Drawing Sheets

WASTE COLLECTION VEHICLE FOR UNMANNED SELF COLLECTION OF DUMPSTER AND METHOD FOR AUTOMATICALLY ALIGNING WASTE COLLECTION VEHICLE

CROSS REFERENCE TO RELATED APPLICATIONS AND CLAIM OF PRIORITY

This application claims the benefit under 35 USC § 119 of Korean Patent Application No. 10-2023-0131457, filed on Oct. 4, 2023, in the Korean Intellectual Property Office, the entire disclosure of which is incorporated herein by reference for all purposes.

BACKGROUND

The present disclosure relates to an unmanned self-collection technology through autonomous traveling, and more particularly, to a technology that automatically aligns a waste collection vehicle for unmanned self (autonomous) collection of a dumpster.

The dumpster is a mobile container for loading waste, which can be transported to a waste disposal site by the waste collection vehicle or lifted on the spot by the waste collection vehicle and then emptied. To this end, the waste collection vehicle is provided with a front loader on the front thereof, and the dumpster is provided with a dumpster hole for docking of the front loader. A worker may dock the front loader to the dumpster hall by manipulating an input means (e.g., a joystick) provided on the waste collection vehicle and then collect the dumpster.

However, this manual collection method by the worker requires the worker's skilled work skills in a process of aligning the waste collection vehicle in front of the dumpster, and has a problem that the worker's work fatigue is very high due to steering for docking of the front loader. In addition, from the collection company's perspective, it is difficult to hire a worker with skilled work skills, and collection quality varies depending on the worker's work skills, which limits an ability to provide a uniform collection service.

SUMMARY

The present disclosure provides a waste collection vehicle for unmanned autonomous collection of a dumpster and a method for automatically aligning a waste collection vehicle in front of a dumpster based on an image photographed by an optical device in an unmanned autonomous collection process.

In accordance with an exemplary embodiment, there is provided a waste collection vehicle for unmanned autonomous collection of a dumpster, a recognition unit configured to recognize the dumpster and a plurality of dumpster holes provided on both sides of the dumpster within a set distance from the dumpster, a steering unit configured to identify outlines of the dumpster and then control a traveling direction of the waste collection vehicle based on the identified outlines until the waste collection vehicle is positioned in front of the dumpster, and a docking unit configured to docks an end of the front loader provided on the waste collection vehicle to the dumpster hole when it is determined that the waste collection vehicle is positioned in front of the dumpster.

The recognition unit may be configured to recognize the dumpster and the dumpster hole based on an image photographed through an optical device provided in the waste collection vehicle and previously learned training data.

The steering unit may be configured to identify, among the outlines of the dumpster, a first outline that is parallel to the ground and positioned between the plurality of dumpster holes, and a second outline that is parallel to the ground and extends in a direction perpendicular to the first outline, and control the traveling direction of the waste collection vehicle based on a length of the first outline and a length of the second outline in the image photographed through an optical device provided in the waste collection vehicle.

The steering unit may be configured to control the traveling direction of the waste collection vehicle in a direction in which the length of the first outline is maximized to the greatest extent relative to the length of the second outline in the image in a process of the waste collection vehicle moving forward or backward.

The waste collection vehicle may further include a control unit configured to control a height of the end of the front loader to a height of the dumpster hole before the end of the front loader is docked to the dumpster hole.

The waste collection vehicle may further include a determination unit that determines whether an obstacle exists in front of the dumpster and whether the dumpster is in an overfill state before the end of the front loader is docked to the dumpster hole, and the docking unit may be configured to dock the end of the front loader to the dumpster hole only when the obstacle does not exist and the dumpster is not in the overfill state.

The waste collection vehicle may further include an identification unit configured to identify, when a plurality of dumpsters that can be collected exist before the dumpster is recognized, a dumpster that needs to be collected among the plurality of dumpsters through image analysis of the plurality of dumpsters or recognition of identification codes attached to the plurality of dumpsters.

In accordance with another exemplary embodiment, there is provided a method for automatically aligning a waste collection vehicle for unmanned autonomous collection of a dumpster performed by the waste collection vehicle, the method including recognizing, by a recognition unit, the dumpster and a plurality of dumpster holes provided on both sides of the dumpster within a set distance from the dumpster, identifying, by a steering unit, outlines of the dumpster and then controlling a traveling direction of the waste collection vehicle based on the identified outlines until the waste collection vehicle is positioned in front of the dumpster, and docking, by a docking unit, an end of the front loader provided on the waste collection vehicle to the dumpster hole when it is determined that the waste collection vehicle is positioned in front of the dumpster.

In the recognizing of the dumpster and the dumpster hole, the dumpster and the dumpster hole may be recognized based on an image photographed through an optical device provided in the waste collection vehicle and previously learned training data.

The controlling of the traveling direction of the waste collection vehicle may include identifying, among the outlines of the dumpster, a first outline that is parallel to the ground and positioned between the plurality of dumpster holes and a second outline that is parallel to the ground and extends in a direction perpendicular to the first outline and controlling the traveling direction of the waste collection vehicle based on a length of the first outline and a length of the second outline in an image photographed through an optical device provided in the waste collection vehicle.

In the controlling of the traveling direction of the waste collection vehicle based on the length of the first outline and the length of the second outline, the traveling direction of the waste collection vehicle may be controlled in a direction in which the length of the first outline is maximized to the greatest extent relative to the length of the second outline in the image in a process of the waste collection vehicle moving forward or backward.

The method for automatically aligning a waste collection vehicle may further include controlling, by the control unit, a height of the end of the front loader to a height of the dumpster hole when it is determined that the waste collection vehicle is positioned in front of the dumpster, before the docking of the end of the front loader to the dumpster hole.

The method for automatically aligning a waste collection vehicle may further include determining whether an obstacle exists in front of the dumpster and whether the dumpster is in an overfill state before the docking of the end of the front loader to the dumpster hole and, in the docking of the end of the front loader to the dumpster hole, the end of the front loader may be docked to the dumpster hole only when the obstacle does not exist and the dumpster is not in the overfill state.

The method for automatically aligning a waste collection vehicle may further include identifying, by an identification unit, when a plurality of collectable dumpsters that can be collected exist before the dumpster is recognized, a dumpster that needs to be collected among the plurality of dumpsters through image analysis of the plurality of dumpsters or recognition of identification codes attached to the plurality of dumpsters, before the recognizing of the dumpster and the dumpster hole.

BRIEF DESCRIPTION OF THE DRAWINGS

Exemplary embodiments can be understood in more detail from the following description taken in conjunction with the accompanying drawings, in which.

DETAILED DESCRIPTION OF EMBODIMENTS

Hereinafter, a specific embodiment of the present disclosure will be described with reference to the drawings. The following detailed description is provided to aid in a comprehensive understanding of the methods, apparatus and/or systems described herein. However, this is illustrative only, and the present disclosure is not limited thereto.

In describing the embodiments of the present disclosure, when it is determined that a detailed description of related known technologies may unnecessarily obscure the subject matter of the present disclosure, a detailed description thereof will be omitted. Additionally, terms to be described later are terms defined in consideration of functions in the present disclosure, which may vary according to the intention or custom of users or workers. Therefore, the definition should be made based on the contents throughout this specification. The terms used in the detailed description are only for describing embodiments of the present disclosure, and should not be limiting. Unless explicitly used otherwise, expressions in the singular form include the meaning of the plural form. In this description, expressions such as "comprising" or "including" are intended to refer to certain features, numbers, steps, actions, elements, some or combination thereof, and it is not to be construed to exclude the presence or possibility of one or more other features, numbers, steps, actions, elements, some or combinations thereof, other than those described.

Figure 1:
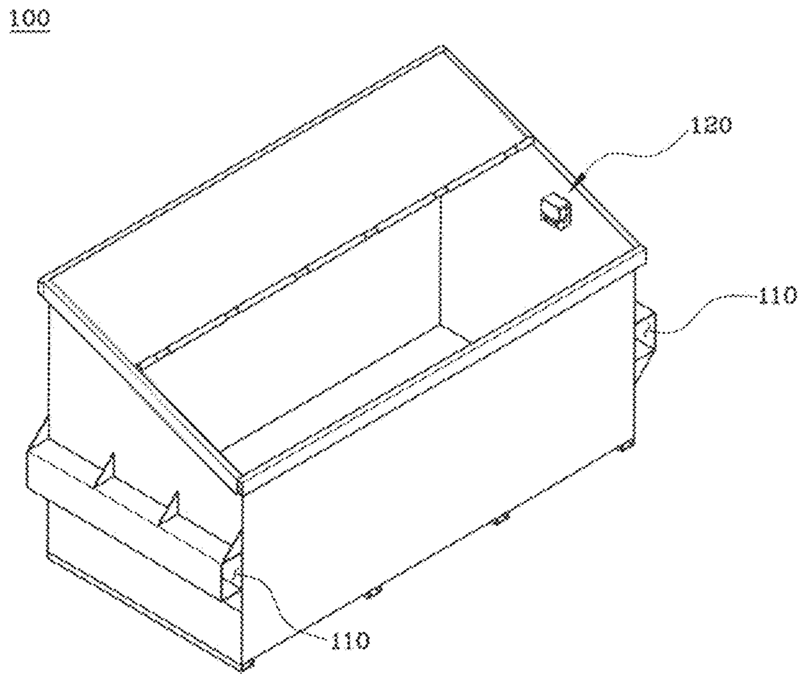
FIG. 1 is a perspective view of a dumpster in accordance with an exemplary embodiment of the present invention.
Figure 2:
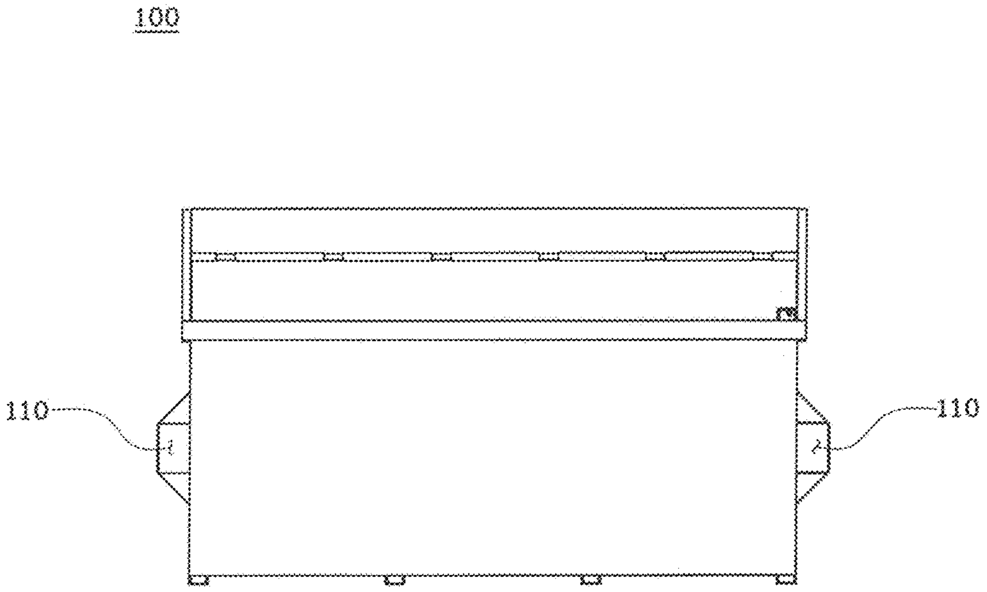
FIG. 2 is a front view of the dumpster in accordance with the exemplary embodiment of the present invention.

FIG. 1 is a perspective view of a dumpster 100 according to an embodiment of the present invention, and FIG. 2 is a front view of the dumpster 100 according to an embodiment of the present invention. In the embodiments, the dumpster 100 is a mobile container for loading waste, and may have a loading space of a predetermined size inside thereof. Here, waste is used in a broad sense including, for example, not only commercial waste discharged from offices, stores, buildings, etc. but also industrial waste such as piles of scrap metal waste, piles of construction cement, etc., marine waste, household waste, etc.

As shown in FIGS. 1 and 2, the dumpster 100 according to an embodiment of the present invention may include a dumpster hole 110 and a sensor module 120.

The dumpster hole 110 is provided on both sides of the dumpster 100 and a front loader 220 of a waste collection vehicle 200 described below is inserted into the dumpster hole 110. The dumpster hole 110 may be formed on each of both sides of the dumpster 100 and may be extended in a direction from the front surface to the back surface of the dumpster 100 by a predetermined length. The dumpster hole 110 may have a square cross-section, but this is only an example, and a cross-sectional shape, cross-sectional size, extension length, etc. of the dumpster hole 110 may vary depending on a size, type, etc. of the dumpster 100.

The sensor module 120 is provided inside the dumpster 100 and acquire various information related to the movement of the dumpster 100 or waste inside the dumpster 100. The sensor module 120 may include, for example, at least one of a shock sensor, an inclination sensor, a load detection sensor, and a camera. As an example, the sensor module 120 may detect an external shock applied to the dumpster 100 through the shock sensor. In addition, when the dumpster 100 is collected by the waste collection vehicle 200, the sensor module 120 may detect an inclination of the dumpster 100 through the inclination sensor and detect collection work of the dumpster 100 accordingly. In addition, the sensor module 120 may detect a load amount of waste in the dumpster 100 through the load detection sensor or the camera. In addition, the sensor module 120 may be provided with a communication module for wireless communication with an external server. The dumpster 100 may transmit and receive various information related to the dumpster 100 to and from the external server through the communication module, and thus may operate as an Internet of Things (IoT) device.

Figure 3:
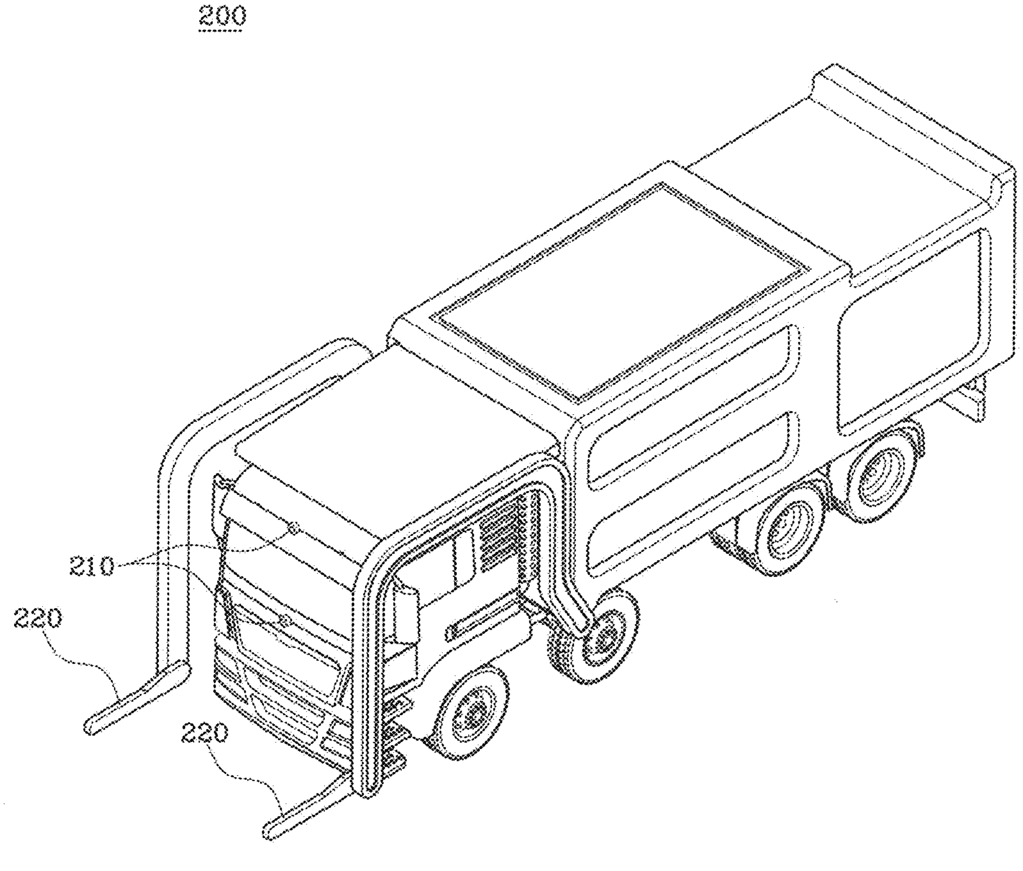
FIG. 3 is a perspective view of a waste collection vehicle in accordance with the exemplary embodiment of the present invention.

FIG. 3 is a perspective view of the waste collection vehicle 200 according to an embodiment of the present invention. In the embodiments of the present invention, the waste collection vehicle 200 is a vehicle-type robot that performs unmanned autonomous collection of the dumpster 100, and may recognize the dumpster 100 on its own without the worker's operation and perform alignment, docking, etc. for the collection work.

To this end, the waste collection vehicle 200 may include an optical device 210 and the front loader 220.

One or more optical devices 210 may be installed at a set position of the waste collection vehicle 200 to photograph the front of the waste collection vehicle 200. The optical device 210 may be, for example, a camera, a camcorder, etc. The optical device 210 may be installed at each of the front upper part and the front center part of the waste collection vehicle 200, but the installation positions and number of the optical devices 210 are not particularly limited. As will be described below, the waste collection vehicle 200 may perform unmanned autonomous collection based on an image photographed by the optical device 210.

The front loader 220 is a means for lifting the dumpster 100 by being inserted into the dumpster hole 110 and is formed so that its end protrudes toward the front of the waste collection vehicle 200. The front loader 220 may be positioned on each of sides of the waste collection vehicle 200 so as to correspond to the position of the dumpster hole 110, and may lift the dumpster 100 while its end is docked to the dumpster hole 110. The end of the front loader 220 may have a size and an extension length corresponding to the dumpster hole 110 so as to be inserted into the dumpster hole 110.

In addition, the waste collection vehicle 200 may further include an autonomous collection module 230 for controlling the unmanned autonomous collection of the waste collection vehicle 200 in conjunction with the optical device 210 and the front loader 220 described above. Hereinafter, a detailed configuration of the waste collection vehicle 200 for unmanned autonomous collection and an unmanned autonomous collection process will be described in more detail with reference to FIGS. 4 to 12.

Figure 4:
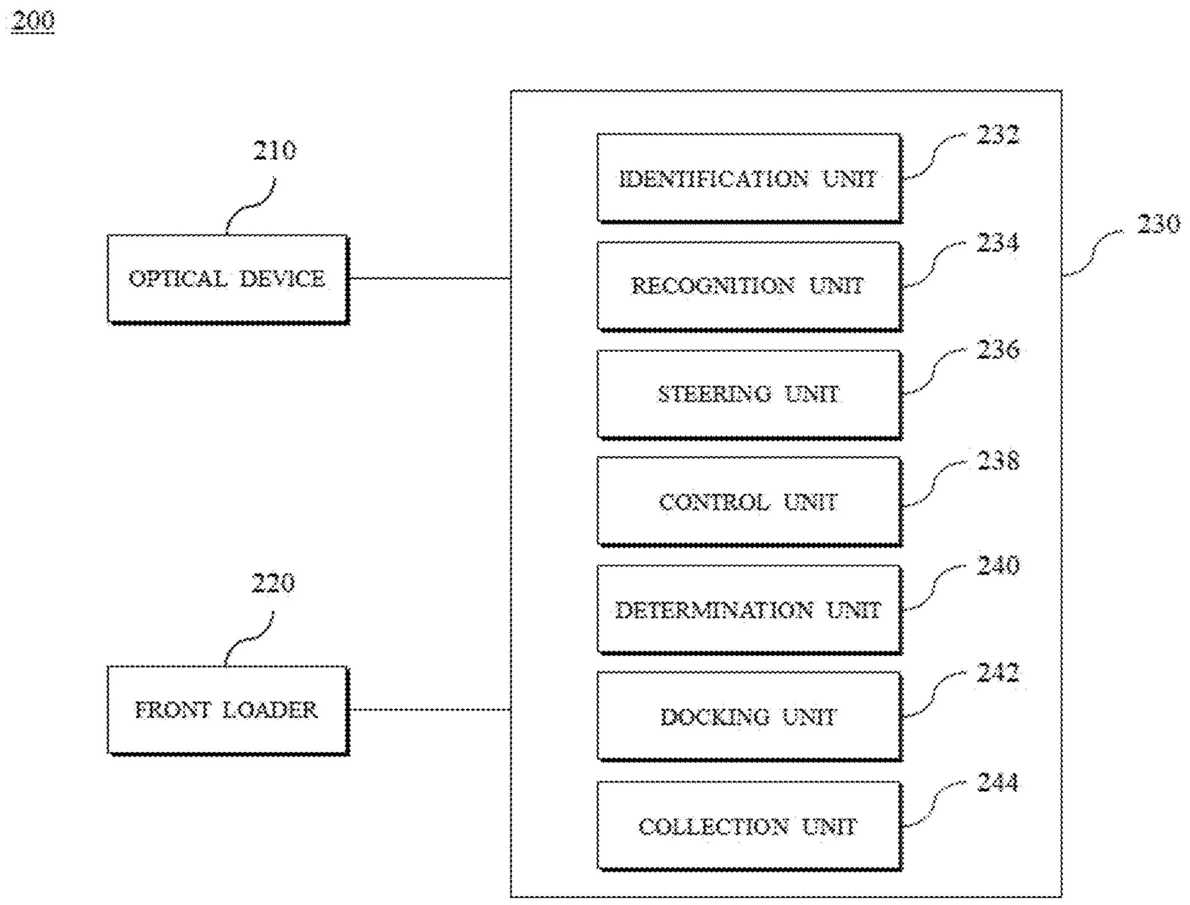
FIG. 4 is a block diagram showing a detailed configuration of the waste collection vehicle in accordance with the exemplary embodiment of the present invention.

FIG. 4 is a block diagram showing a detailed configuration of the waste collection vehicle 200 according to an embodiment of the present invention.

As shown in FIG. 4, the waste collection vehicle 200 may include the optical device 210, the front loader 220, and the autonomous collection module 230. As described above, the optical device 210 and the front loader 220 are provided on the outer surface of the waste collection vehicle 200. The autonomous collection module 230 may be implemented on a computing device (not shown) provided inside the waste collection vehicle 200. As will be described below, the computing device is configured in a hardware form and may operate according to the execution of one or more computer-executable instructions.

Referring to FIG. 4, the autonomous collection module 230 may include an identification unit 232, a recognition unit 234, a steering unit 236, a control unit 238, a determination unit 240, a docking unit 242, and a collection unit 244.

The identification unit 232 identifies the dumpster 100 that needs to be collected. The waste collection vehicle 200 may receive a collection path for collecting the dumpster 100 from a server (not shown) and may move near the dumpster 100 according to the collection path. The identification unit 232 may be triggered and operate when the waste collection vehicle 200 is positioned within a set distance (e.g., approximately 20 m) from the dumpster 100. When one or more dumpsters that can be collected within a set distance exist, the identification unit 232 may identify the dumpster 100 that currently needs to be collected through image analysis of each dumpster or recognition of an identification code attached to each of the dumpsters.

As an example, when a plurality of dumpsters that can be collected exist near the waste collection vehicle 200 and the dumpster color, dumpster size, dumpster location, etc. are different for each dumpster, the identification unit 232 may identify the dumpster 100 that needs to be collected by comparing an image photographed by the optical device 210 with previously learned training data. That is, the identification unit 232 may determine the dumpster that is a collection target by determining what color, size, or location the dumpster has at the current location through a deep learning model. For example, the identification unit 232 may identify a dumpster having a specific color among a plurality of dumpsters positioned within a set distance from the current point as a dumpster 100 to be collected based on training data collected in the past.

As another example, when a plurality of dumpsters that can be collected exist near the waste collection vehicle 200 and a different identification code is attached to each of the dumpsters, the identification unit 232 may recognize each identification code through a separate recognition device such as the optical device 210 or a reader (not shown) to identify a dumpster 100 that needs to be collected. Here, the identification code is an optical recognition code and may be, for example, a QR code, an ID tag, etc. The identification unit 232 may recognize, for example, the identification code of each dumpster from the image photographed by the optical device 210 to identify the dumpster 100 that needs to be collected.

Figure 5:
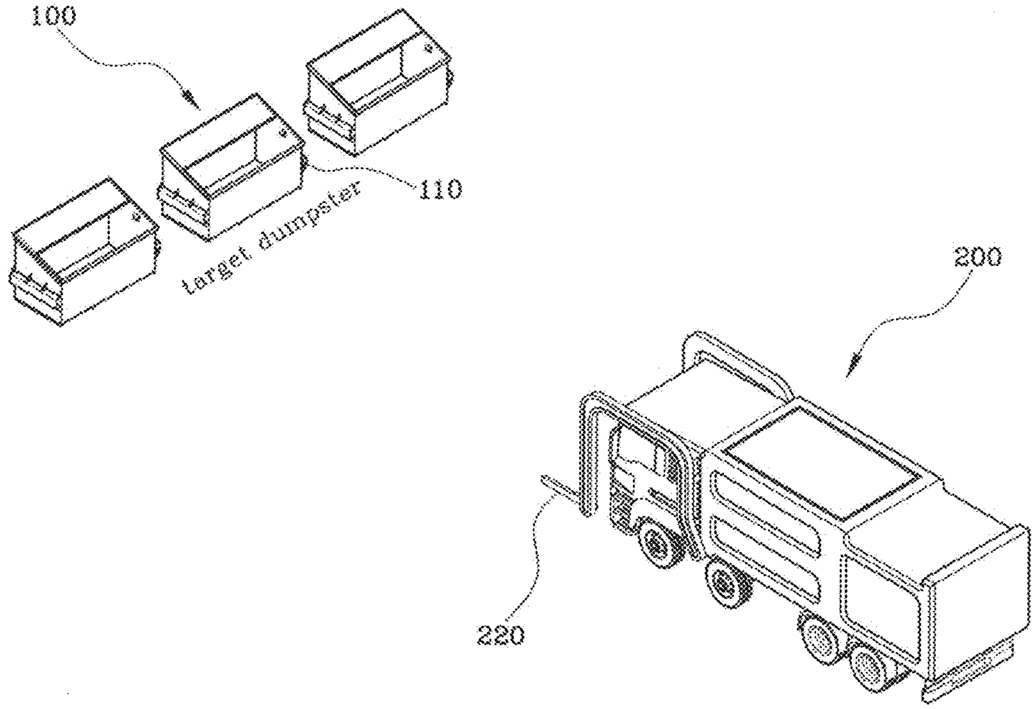
FIG. 5 illustrates an example showing a process of identifying a dumpster that is a collection target by an identification unit in accordance with the exemplary embodiment of the present invention.

FIG. 5 illustrates an example showing a process of identifying a dumpster 100 that is a collection target by the identification unit 232 according to an embodiment of the present invention.

As shown in FIG. 5, when a plurality of dumpsters that can be collected exist, the identification unit 232 may identify the dumpster 100 that needs to be collected among the plurality of dumpsters through image analysis of the plurality of dumpsters or recognition of the identification codes attached to the plurality of dumpsters. When the dumpster 100 is identified by the identification unit 232, the waste collection vehicle 200 may move forward a little further near the identified dumpster 100. In this case, the identification unit 232 may determine in which direction (left, right, etc.) the dumpster 100 is positioned from the front of the waste collection vehicle 200, and accordingly, the waste collection vehicle 200 may move near the dumpster 100.

The recognition unit 234 recognizes the dumpster 100 and a plurality of dumpster holes 110 within a set distance, (e.g., approximately 10 m) from the dumpster 100. As an example, the recognition unit 234 may recognize the dumpster 100 and the dumpster hole 110 based on the image photographed through the optical device 210 and previously learned training data. Specifically, the recognition unit 234 may analyze the image photographed through the optical device 210 to extract a feature of the dumpster 100, and recognize the dumpster 100 based on the extracted feature and the training data. In addition, the recognition unit 234 may simultaneously recognize the dumpster hole 110 in a process of recognizing the dumpster 100, or recognize the dumpster hole 110 while the waste collection vehicle 200 approaches the dumpster 100 after recognizing the dumpster 100. The recognition unit 234 may extract the feature point of the dumpster hole 110 and recognize the dumpster hole 110 based on the extracted feature point and the training data. Here, the training data may be, for example, a plurality of dumpster images photographed from different angles, a plurality of dumpster hole images, etc.

Figure 6:
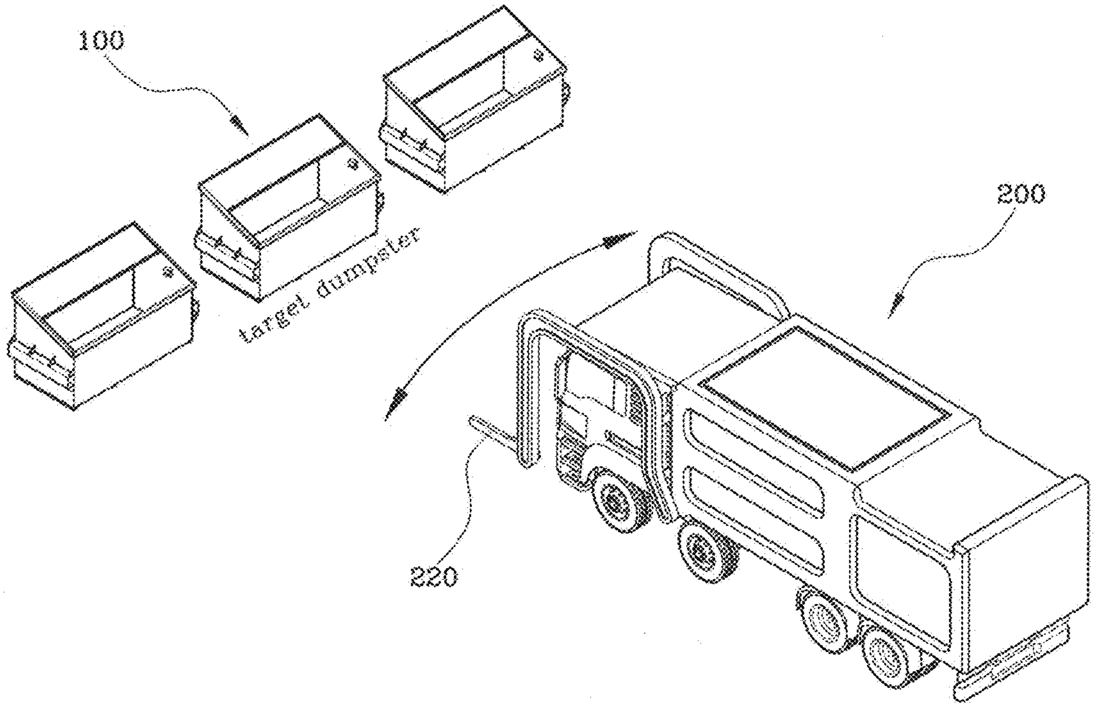
FIG. 6 illustrates an example showing a process of recognizing a dumpster and a dumpster hole by a recognition unit in accordance with the exemplary embodiment of the present invention.

FIG. 6 illustrates an example showing a process of recognizing the dumpster 100 and the dumpster hole 110 by the recognition unit 234 according to an embodiment of the present invention.

Referring to FIG. 6, the recognition unit 234 may recognize the dumpster 100 and the dumpster hole 110 by comparing each of the feature point of the dumpster 100 and the feature point of the dumpster hole 110 with a feature point of the training data. When the dumpster 100 and the dumpster hole 110 are recognized by the recognition unit 234, a traveling direction of the waste collection vehicle 200 is controlled by the steering unit 236 described below.

The steering unit 236 identifies an outline of the dumpster 100 and then controls the traveling direction of the waste collection vehicle 200 based on the identified outline until the waste collection vehicle 200 is positioned in front of the dumpster 100. In order to perform unmanned autonomous collection of the dumpster 100, it is necessary to align the waste collection vehicle 200 in front of the dumpster 100. Accordingly, the steering unit 236 may identify different outlines that constitute the dumpster 100 and then control the traveling direction of the waste collection vehicle 200 based on the identified outlines.

FIGS. 7 and 8A to 8C are diagrams for describing a process of controlling the traveling direction of the waste collection vehicle 200 by the steering unit 236 according to an embodiment of the present invention.

Figure 7:
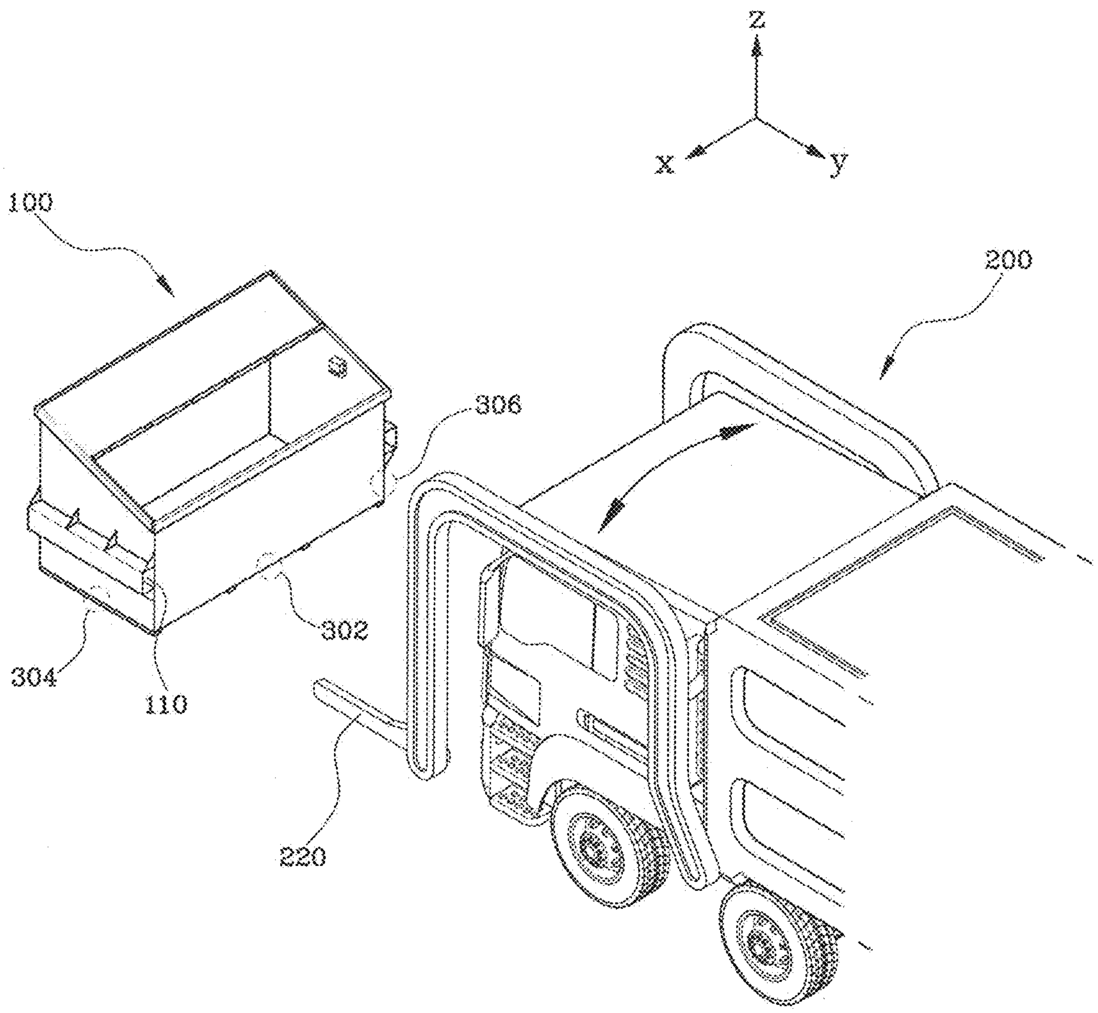
FIG. 7 is a diagram for describing a process of controlling a traveling direction of a waste collection vehicle by a steering unit in accordance with the exemplary embodiment of the present invention.

Referring to FIG. 7, the outlines of the dumpster 100 may be composed of one or more first outlines 302, one or more second outlines 304, and one or more third outlines 306. Here, the first outline 302 is an outline that is parallel to the ground and positioned between a plurality of dumpster holes 110, and may be an outline in the x-axis direction of FIG. 7. In addition, the second outline 304 is an outline that is parallel to the ground and extends in a direction perpendicular to the first outline 302, and may be an outline in the y-axis direction of FIG. 7. In addition, the third outline 306 is an outline that extends in a direction perpendicular to the ground, the first outline 302, and the second outline 304, and may be an outline in the z-axis direction of FIG. 7. A plurality of the first outline 302, the second outline 304, and the third outline 306 may each exist, and the steering unit 236 may identify these outlines. In particular, the steering unit 236 may identify the first outline 302 and the second outline 304, and control the traveling direction of the waste collection vehicle 200 based on a length of the first outline 302 and a length of the second outline 304 in the image photographed by the optical device 210.

Figure 8A:
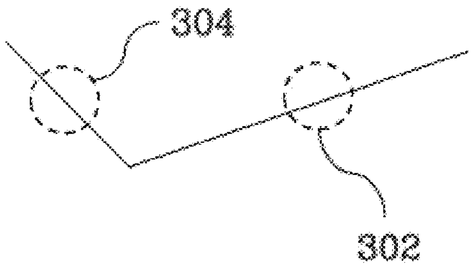
FIGS. 8A to 8C are another diagram for describing the process of controlling the traveling direction of the waste collection vehicle by the steering unit in accordance with the exemplary embodiment of the present invention.
Figure 8B:
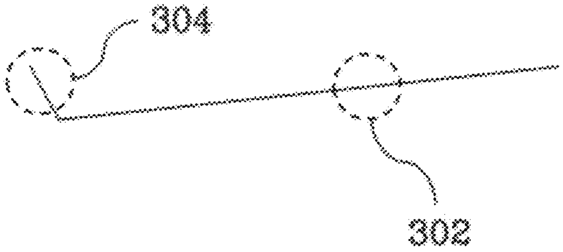
Figure 8C:
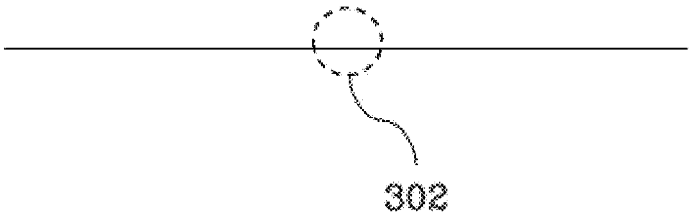

Referring to FIGS. 8A to 8C, the steering unit 236 may control the traveling direction of the waste collection vehicle 200 in the direction in which the length of the first outline 302 is maximized to the greatest extent relative to the length of the second outline 304 in the image in a process of the waste collection vehicle 200 moving forward or backward. The steering unit 236 may measure the length of the first outline 302 and the length of the second outline 204 in the image photographed by the optical device 210 in real time while moving the waste collection vehicle 200 forward or backward.

In this case, the steering unit 236 may grasp the position of the dumpster 100 by determining whether the dumpster 100 is positioned on the left or right of a vertical front reference line after setting the virtual front reference line to be parallel to the longitudinal direction of the waste collection vehicle 200 (i.e., in the forward direction of the waste collection vehicle 200). The steering unit 236 may measure the length of the first outline 302 and the length of the second outline 204 on the image in real time in a process of the waste collection vehicle 200 approaching the position of the dumpster 100, and control the traveling direction of the waste collection vehicle 200 more precisely and accurately by using the length of the first outline 302 and the length of the second outline 204 on the measured image.

As shown in FIG. 8A, when the waste collection vehicle 200 is not positioned in front of the dumpster 100, the length of the second outline 304 in the image may appear relatively large. If the waste collection vehicle 200 moves backward, the length of the second outline 304 in the image becomes smaller, but the length of the first outline 302 in the image may also become smaller.

As shown in FIG. 8B, when the waste collection vehicle 200 is positioned close to the front of the dumpster 100, the length of the second outline 304 in the image may decrease while the length of the first outline 302 in the image may increase relatively.

As shown in FIG. 8C, when the waste collection vehicle 200 is positioned in front of the dumpster 100, the length of the second outline 304 in the image may become 0 while the length of the first outline 302 in the image may increase to the maximum. That is, when the waste collection vehicle 200 is positioned in front of the dumpster 100, the length of the first outline 302 in the image may be maximized to the greatest extent relative to the length of the second outline 304. Since the dumpster 100 is formed in a three-dimensional rectangular shape and the first outline 302 and the second outline 304 are arranged perpendicularly to each other in a direction from the front surface to the back surface of the dumpster 100, when the waste collection vehicle 200 is positioned in front of the dumpster 100, the length of the first outline 302 may be maximized to the greatest extent relative to the length of the second outline 304 in the image.

Figure 9:
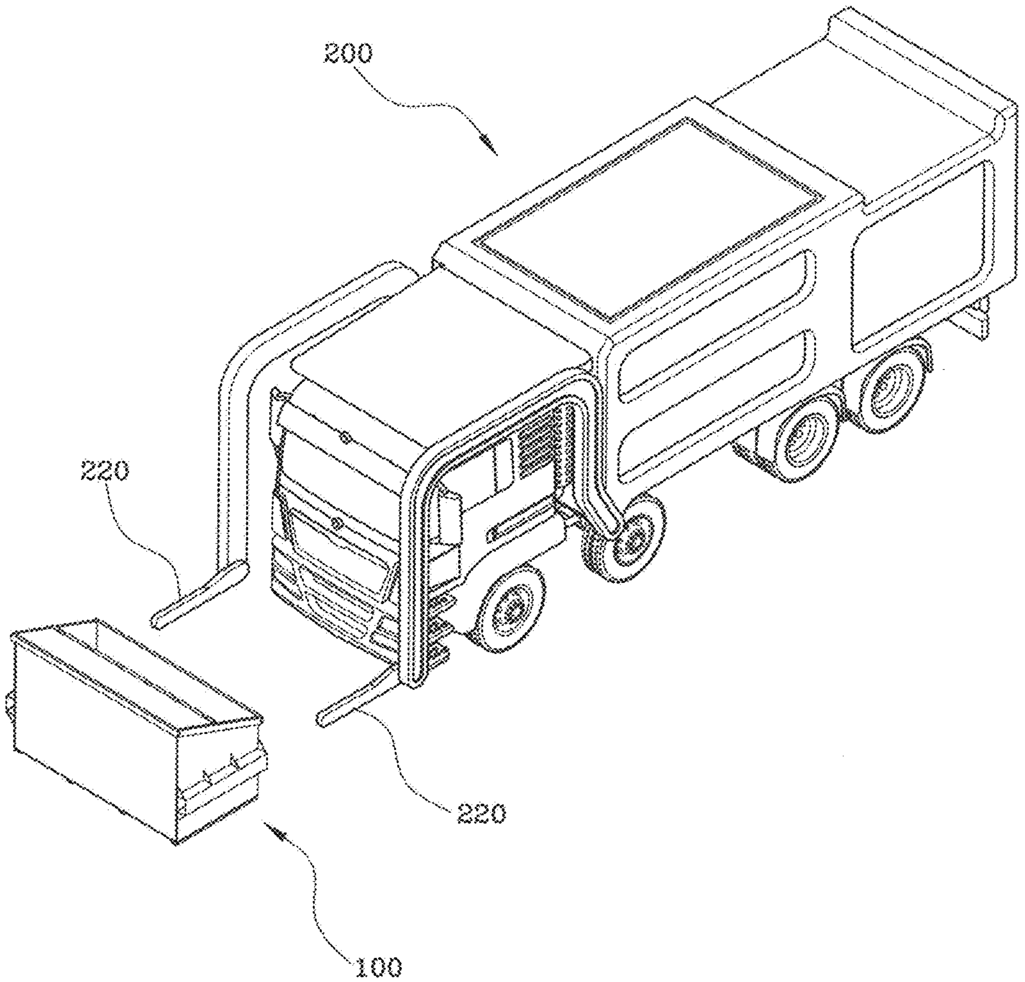
FIG. 9 is a perspective view showing a state in which a waste collection vehicle is positioned in front of a dumpster in accordance with the exemplary embodiment of the present invention.
Figure 10:
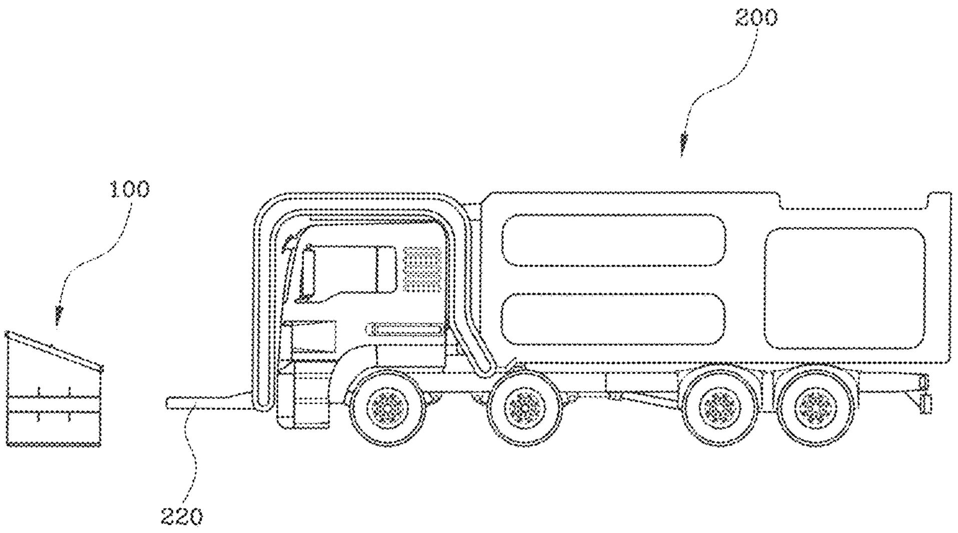
FIG. 10 is a side view showing the state in which the waste collection vehicle is positioned in front of the dumpster in accordance with the exemplary embodiment of the present invention.
Figure 11:
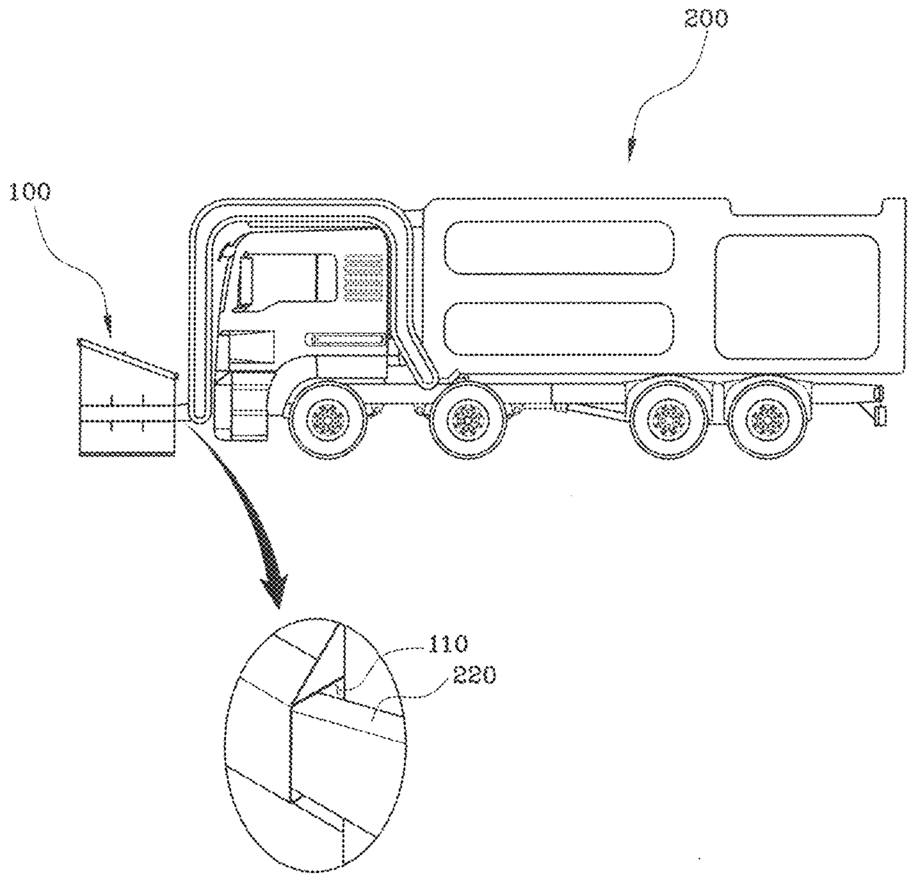
FIG. 11 illustrates an example showing a process of docking an end of a front loader to a dumpster hole by a docking unit in accordance with the exemplary embodiment of the present invention.

FIG. 9 is a perspective view showing a state in which the waste collection vehicle 200 is positioned in front of the dumpster 100 according to an embodiment of the present invention, and FIG. 10 is a side view showing a state in which the waste collection vehicle 200 is positioned in front of the dumpster 100 according to an embodiment of the present invention.

Referring to FIGS. 9 and 10, it can be confirmed that the waste collection vehicle 200 is accurately aligned toward the front of the dumpster 100.

In this way, according to the embodiment of the present invention, the traveling direction of the waste collection vehicle 200 may be automatically controlled so that the waste collection vehicle 200 is positioned in front of the dumpster 100 based on the length of the first outline 302 and the length of the second outline 304 in the image photographed by the optical device 210 of the waste collection vehicle 200. In this case, a separate guide line for aligning the waste collection vehicle 200 is unnecessary, and even if the position or direction of the dumpster 100 is slightly changed after the collection work, the waste collection vehicle 200 may be more easily aligned in front of the dumpster 100 in the next collection work process.

The control unit 238 controls a height of the end of the front loader 220 to a height of the dumpster hole 110. In a state where the waste collection vehicle 200 is positioned in front of the dumpster 100 under the control of the steering unit 236, the control unit 238 may match the height of the end of the front loader 220 with the height of the dumpster hole 110. When the height of the end of the front loader 220 matches the height of the dumpster hole 110, the end of the front loader 220 and the dumpster hole 110 are positioned in a straight line. When the steering of the waste collection vehicle 200 and the height control of the front loader 220 are completed, preparations for docking of the front loader 220 may be completed. However, even in this case, when an obstacle exists in front of the dumpster 100 or the dumpster 100 is in an overfill state, unmanned autonomous collection by the waste collection vehicle 200 may be difficult.

Therefore, the determination unit 240 may determine whether an obstacle exists in front of the dumpster 100 and whether the dumpster 100 is in the overfill state before the end of the front loader 220 is docked to the dumpster hole 110. Here, the obstacle may be a moving object, such as, for example, a person, a vehicle, an animal, etc. Even when preparations for docking of the front loader 220 are completed, if an obstacle suddenly occurs in front of the dumpster 100, the determination unit 240 may detect the sudden occurrence of the obstacle. In addition, when the dumpster 100 is in the overfill state, since a pile of waste may be piled up in front of the dumpster 100, the determination unit 240 may detect the pile of waste. Here, the overfill state means a state in which waste inside the dumpster 100 is loaded in excess of a predetermined standard value.

The docking unit 242 docks the end of the front loader 220 provided on the waste collection vehicle 200 to the dumpster hole 110 when it is determined that the waste collection vehicle 200 is positioned in front of the dumpster 100. That is, the docking unit 242 may move the waste collection vehicle 200 toward the front of the dumpster 100 and dock the end of the front loader 220 to the dumpster hole 110. In this case, the control unit 238 may control the height of the end of the front loader 220 to the height of the dumpster hole 110 before the end of the front loader 220 is docked to the dumpster hole 110. In addition, the determination unit 240 may determine whether an obstacle exists in front of the dumpster 100 and whether the dumpster 100 is in the overfill state before the end of the front loader 220 is docked to the dumpster hole 110. The docking unit 242 may dock the end of the front loader 220 to the dumpster hole 110 only when the obstacle does not exist and the dumpster 100 is not in the overfill stat, and thus, safer unmanned autonomous collection may be achieved. In addition, when an obstacle exists in front of the dumpster 100, the docking unit 242 may wait for a certain period of time until the obstacle is removed, and then initiate the docking work when the obstacle is completely removed. In addition, when an obstacle exists in front of the dumpster 100 or the dumpster 100 is in the overfill state, the docking unit 242 may transmit a message indicating that unmanned autonomous collection is impossible to an administrator terminal (not shown).

The collection unit 244 performs the collection work of the dumpster 100 when the docking of the front loader 220 by the docking unit 242 is completed.

Figure 12:
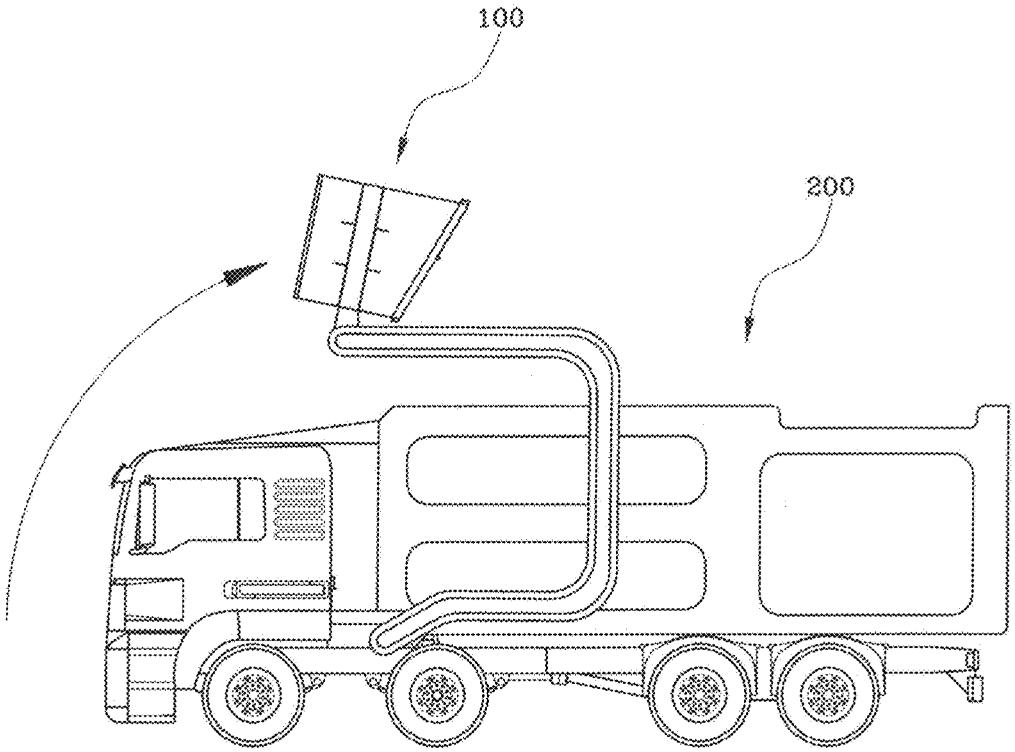
FIG. 12 illustrates an example showing a process of collecting a dumpster by a collection unit in accordance with the exemplary embodiment of the present invention.

FIG. 12 illustrates an example showing a process of collecting the dumpster 100 by the collection unit 244 according to an embodiment of the present invention.

As shown in FIG. 12, the collection unit 244 may control the operation of the front loader 220 to lift the dumpster 100 and then empty the waste in the dumpster 100 into a bin (not shown) in the waste collection vehicle 200 or load the dumpster 100 onto the waste collection vehicle 200.

Figure 13:
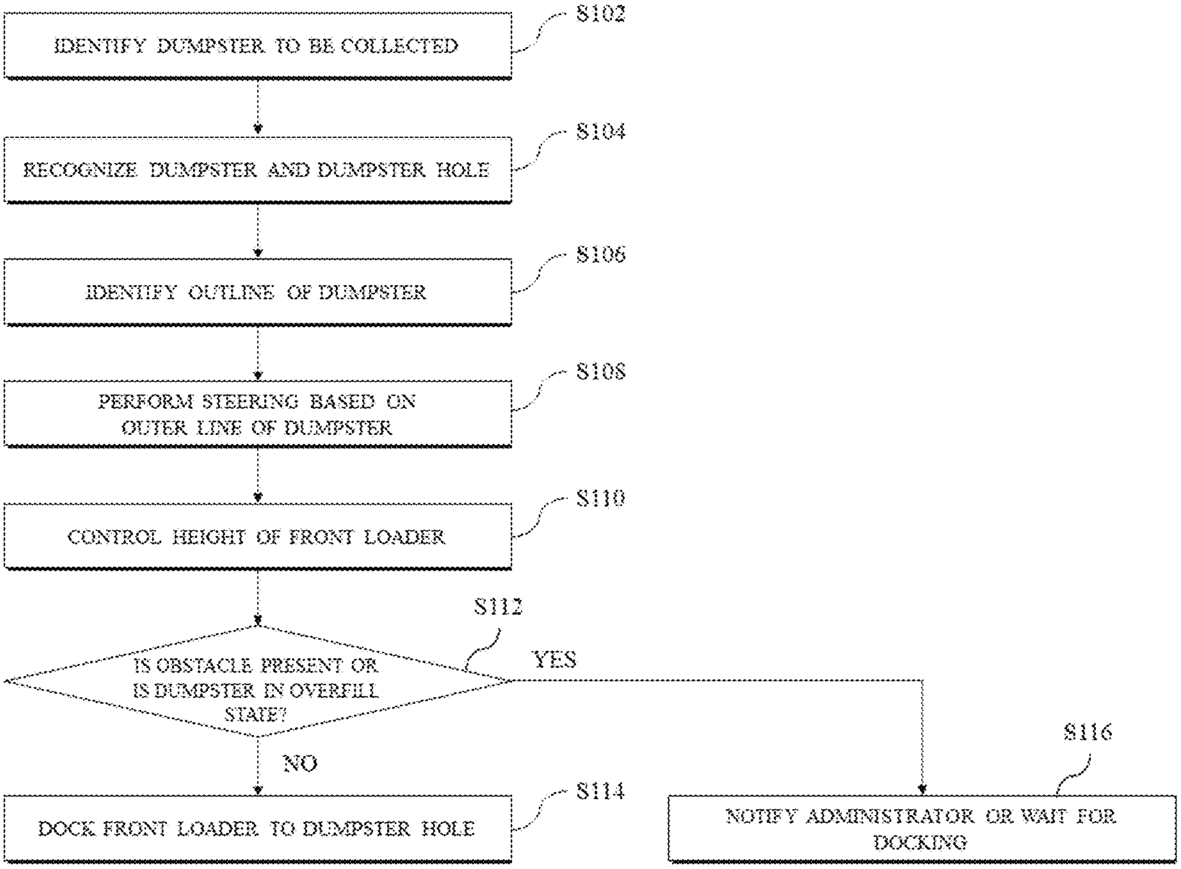
FIG. 13 is a flowchart for describing a method for automatically aligning a waste collection vehicle in accordance with another exemplary embodiment of the present invention.

FIG. 13 is a flowchart for describing a method for automatically aligning the waste collection vehicle 200 according to an embodiment of the present invention. In the illustrated flowchart, the above method is described as being divided into a plurality of steps, but at least some of the steps may be performed in a different order, combined with other steps to be performed together, omitted, divided into sub-steps to be performed, or performed by being added with one or more steps (not shown).

In step S102, the identification unit 232 identifies a dumpster 100 that needs to be collected. When a plurality of dumpsters that can be collected exist near the waste collection vehicle 200, the identification unit 232 may identify the dumpster 100 that needs to be collected through image analysis of each dumpster or recognition of an identification code attached to each of the dumpsters.

In step S104, the recognition unit 242 recognizes the dumpster 100 and the dumpster hole 110 within a set distance from the dumpster 100. The recognition unit 242 may recognize the dumpster 100 and the dumpster hole 110 based on, for example, an image photographed through the optical device 210 and previously learned training data.

In step S106, the steering unit 236 identifies outlines of the dumpster 100. Specifically, the steering unit 236 may identify a first outline 302 that is parallel to the ground and positioned between a plurality of dumpster holes and a second outline 304 that is parallel to the ground and extends in a direction perpendicular to the first outline 302, among the outlines of the dumpster 100.

In step S108, the steering unit 236 controls the traveling direction of the waste collection vehicle 200 based on the identified outlines of the dumpster 100 until the waste collection vehicle 200 is positioned in front of the dumpster 100. Specifically, the steering unit 236 may control the traveling direction of the waste collection vehicle 200 in a direction in which the length of the first outline 304 is maximized to the greatest extent relative to the length of the second outline 304 in the image photographed by the optical device 210 while moving the waste collection vehicle 200 forward or backward. The steering unit 236 may measure the length of the first outline 304 and the length of the second outline 304 in the image photographed by the optical device 210 in real time, and control the traveling direction of the waste collection vehicle 200 until the length of the first outline 304 appears to be the largest relative to the length of the second outline 304 in the image.

In step S110, the control unit 238 may control the height of the end of the front loader 220 to the height of the dumpster hole 110.

In step S112, the determination unit 240 determines whether an obstacle exists in front of the dumpster 100 or whether the dumpster 100 is in an overfill state.

In step S114, when it is determined that no obstacle exist in front of the dumpster 100 and that the dumpster 100 is not in the overfill state in step S112, the docking unit 242 docks the end of the front loader 220 to the dumpster hole 110.

In step S116, when it is determined that the obstacle exists in front of the dumpster 100 in step S112, the docking unit 242 may wait for a certain period of time until the obstacle is removed. In addition, when it is determined that the obstacle exists in front of the dumpster 100 or the dumpster 100 is in the overfill state in step S112, the docking unit 242 may transmit a message indicating that unmanned autonomous collection is impossible to the administer terminal (not shown).

Figure 14:
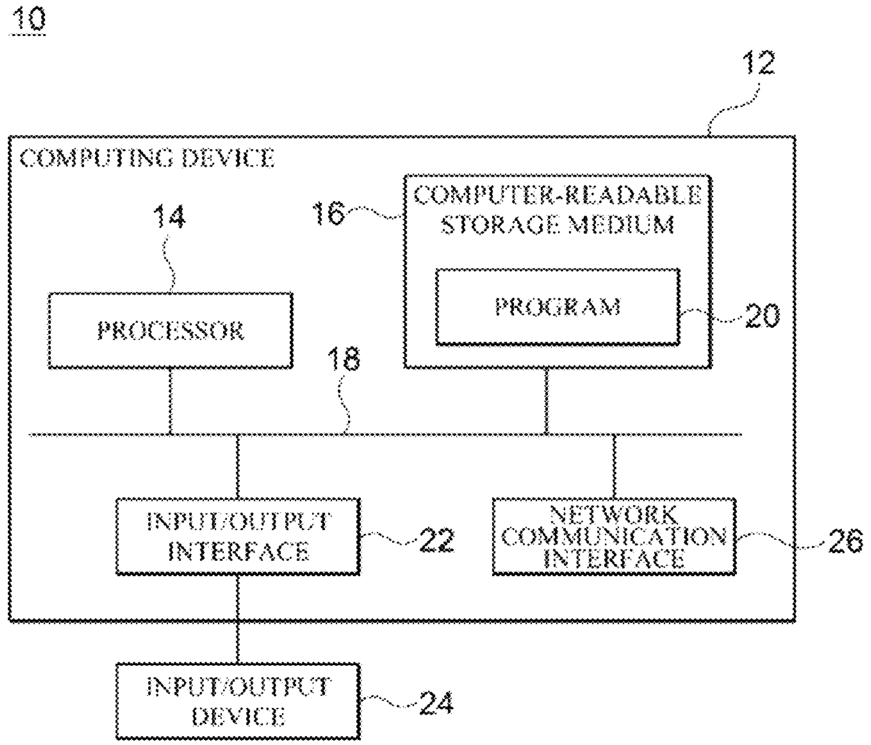
FIG. 14 is a block diagram for describing a computing environment including a computing device suitable for use in exemplary embodiments.

FIG. 14 is a block diagram for illustratively describing a computing environment including a computing device according to an embodiment. In the illustrated embodiment, respective components may have different functions and capabilities other than those described below, and may include additional components in addition to those described below.

The illustrated computing environment 10 includes a computing device 12. In one embodiment, the computing device 12 may be one or more components included in the waste collection vehicle 200 or the autonomous collection module 230 of the waste collection vehicle 200.

The computing device 12 includes at least one processor 14, a computer-readable storage medium 16, and a communication bus 18. The processor 14 may cause the computing device 12 to operate according to the exemplary embodiment described above. For example, the processor 14 may execute one or more programs stored on the computer-readable storage medium 16. The one or more programs may include one or more computer-executable instructions, which, when executed by the processor 14, may be configured so that the computing device 12 performs operations according to the exemplary embodiment.

The computer-readable storage medium 16 is configured so that the computer-executable instruction or program code, program data, and/or other suitable forms of information are stored. A program 20 stored in the computer-readable storage medium 16 includes a set of instructions executable by the processor 14. In an embodiment, the computer-readable storage medium 16 may be a memory (volatile memory such as a random access memory, non-volatile memory, or any suitable combination thereof), one or more magnetic disk storage devices, optical disk storage devices, flash memory devices, other types of storage media that are accessible by the computing device 12 and capable of storing desired information, or any suitable combination thereof.

The communication bus 18 interconnects various other components of the computing device 12, including the processor 14 and the computer-readable storage medium 16.

The computing device 12 may also include one or more input/output interfaces 22 that provide an interface for one or more input/output devices 24, and one or more network communication interfaces 26. The input/output device 24 may be connected to other components of the computing device 12 through the input/output interface 22. The input/output device 24 may be connected to other components of the computing device 12 through the input/output interface 22. The exemplary input/output device 24 may include a pointing device (such as a mouse or trackpad), a keyboard, a touch input device (such as a touch pad or touch screen), a speech or sound input device, input devices such as various types of sensor devices and/or photographing devices, and/or output devices such as a display device, a printer, a speaker, and/or a network card. The exemplary input/output device 24 may be included inside the computing device 12 as a component configuring the computing device 12, or may be connected to the computing device 12 as a separate device distinct from the computing device 12.

According to embodiments of the present disclosure, unmanned autonomous collection of the dumpster can be performed more efficiently by automatically aligning the waste collection vehicle in front of the dumpster without separate manipulation by the worker. More specifically, a traveling direction of the waste collection vehicle can be automatically controlled so that the waste collection vehicle is positioned in front of the dumpster based on a length of a first outline and a second outline in an image photographed by an optical device of the waste collection vehicle. In this case, separate guide lines for aligning the waste collection vehicle are unnecessary, and even if the position or direction of the dumpster is slightly changed after the collection operation, the waste collection vehicle can be more easily aligned in front of the dumpster in the next collection operation.

Although the waste collection vehicle for unmanned autonomous collection of a dumpster and the method for automatically aligning a waste collection vehicle have been described with reference to the specific embodiments, they are not limited thereto. Therefore, it will be readily understood by those skilled in the art that various modifications and changes can be made thereto without departing from the spirit and scope of the present invention defined by the appended claims. The scope of rights of the present disclosure should not be limited to the described embodiments, but should be defined not only by claims set forth below but also by equivalents to the claims.

What is claimed is:

1. A waste collection vehicle that is provided with an optical device and a front loader and performs unmanned self-collection of a dumpster in conjunction with the optical device and the front loader, the waste collection vehicle comprising:

a recognition unit configured to recognize the dumpster and a plurality of dumpster holes provided on both sides of the dumpster within a set distance from the dumpster;

a steering unit configured to identify outlines of the dumpster and then control a traveling direction of the waste collection vehicle based on the identified outlines until the waste collection vehicle is positioned in front of the dumpster;

a docking unit configured to docks an end of the front loader provided on the waste collection vehicle to the dumpster hole when it is determined that the waste collection vehicle is positioned in front of the dumpster; and a control unit configured to control a height of the end of the front loader to a height of the dumpster hole before the end of the front loader is docked to the dumpster hole, wherein the steering unit is configured to identify a first outline that is parallel to the ground and located between the plurality of dumpster holes, and a second outline that is parallel to the ground and extends in a direction perpendicular to the first outline, among the outlines of the dumpster on an image photographed by the optical device, in real time in a process of the waste collection vehicle approaching a position of the dumpster after the position of the dumpster is determined, and control the traveling direction of the waste collection vehicle in a direction in which a length of the first outline is maximized to the greatest extent relative to a length of the second outline in the image in a process of the waste collection vehicle moving forward or backward, the first outline and the second outline are arranged perpendicular to each other in a direction from a front surface to a back surface of the dumpster, and as the waste collection vehicle is positioned closer to the front of the dumpster, the length of the second outline in the image decreases and the length of the first outline in the image increases.

2. The waste collection vehicle of claim 1, wherein the recognition unit is configured to recognize the dumpster and the dumpster hole based on the image photographed through the optical device and previously learned training data.

3. The waste collection vehicle of claim 1, further comprising a determination unit configured to determine whether an obstacle exists in front of the dumpster and whether the dumpster is in an overfill state before the end of the front loader is docked to the dumpster hole, wherein the docking unit is configured to dock the end of the front loader to the dumpster hole only when the obstacle does not exist and the dumpster is not in the overfill state.

4. The waste collection vehicle of claim 1, further comprising an identification unit configured to identify, when a plurality of dumpsters that are collection target dumpsters exist before the dumpster is recognized, a dumpster that needs to be collected among the plurality of dumpsters through image analysis of the plurality of dumpsters or recognition of identification codes attached to the plurality of dumpsters.

5. A method for automatically aligning a waste collection vehicle that is performed by the waste collection vehicle provided with an optical device and a front loader and performing unmanned self-collection of a dumpster in conjunction with the optical device and the front loader, the method comprising:

recognizing, by a recognition unit, the dumpster and a plurality of dumpster holes provided on both sides of the dumpster within a set distance from the dumpster;

identifying, by a steering unit, outlines of the dumpster and then controlling a traveling direction of the waste collection vehicle based on the identified outlines until the waste collection vehicle is positioned in front of the dumpster;

controlling, by a control unit, a height of an end of the front loader to a height of the dumpster hole when it is determined that the waste collection vehicle is positioned in front of the dumpster; and docking, by a docking unit, the end of the front loader provided on the waste collection vehicle to the dumpster hole when it is determined that the waste collection vehicle is positioned in front of the dumpster, wherein in the controlling of the traveling direction of the waste collection vehicle, a first outline that is parallel to the ground and located between the plurality of dumpster holes and a second outline that is parallel to the ground and extends in a direction perpendicular to the first outline, among the outlines of the dumpster on an image photographed by the optical device, are identified in real time, in a process of the waste collection vehicle approaching a position of the dumpster after the position of the dumpster is determined, and the traveling direction of the waste collection vehicle is controlled in a direction in which a length of the first outline is maximized to the greatest extent relative to a length of the second outline in the image in a process of the waste collection vehicle moving forward or backward, the first outline and the second outline are arranged perpendicular to each other in the direction from the front to the back of the dumpster, and as the waste collection vehicle is positioned closer to the front of the dumpster, the length of the second outline in the image decreases and the length of the first outline in the image increases.

6. The method of claim 5, wherein, in the recognizing of the dumpster and the dumpster hole, the dumpster and the dumpster hole are recognized based on the image photographed through the optical device and previously learned training data.

7. The method of claim 5, further comprising determining whether an obstacle exists in front of the dumpster and whether the dumpster is in an overfill state before the docking of the end of the front loader to the dumpster hole, wherein in the docking of the end of the front loader to the dumpster hole, the end of the front loader is docked to the dumpster hole only when the obstacle does not exist and the dumpster is not in the overfill state.

8. The method of claim 5, further comprising identifying, when a plurality of collectable dumpsters that are collection target dumpsters exist before the dumpster is recognized, the dumpster that needs to be collected among the plurality of dumpsters through image analysis of the plurality of dumpsters or recognition of identification codes attached to the plurality of dumpsters, before the docking of the end of the front loader to the dumpster hole.

* * * * *